United States Patent [19]

Walker et al.

[11] Patent Number: 4,649,369

[45] Date of Patent: Mar. 10, 1987

[54] APPARATUS FOR DETERMINING THE POSITION OF A FIFTH WHEEL ON A MULTI-AXLE VEHICLE

[75] Inventors: Robert L. Walker; Dale A. Crowe, both of Yakima; Paul D. Lund, Union Gap, all of Wash.

[73] Assignee: Partnership of Robert Walker and Paul Lund, Yakima, Wash.

[21] Appl. No.: 775,615

[22] Filed: Sep. 13, 1985

[51] Int. Cl.⁴ ............................................. B60Q 1/00
[52] U.S. Cl. .................................. 340/52 R; 280/407; 280/438 R; 340/686
[58] Field of Search ............. 340/52 R, 686; 280/407, 280/439, 438 R, 441, 477

[56] References Cited

U.S. PATENT DOCUMENTS

| | | |
|---|---|---|
| 2,835,504 | 5/1958 | Acker ............................. 280/407 X |
| 3,112,936 | 12/1963 | Cole et al. ........................... 280/407 |
| 3,584,899 | 6/1971 | Gottler ................................. 280/407 |
| 4,429,892 | 2/1984 | Frampton et al. .......... 280/438 R X |
| 4,505,344 | 3/1985 | Hobbs et al. ..................... 280/407 X |

Primary Examiner—James L. Rowland
Assistant Examiner—Brian R. Tumm
Attorney, Agent, or Firm—Graybeal, Jensen & Puntigam

[57] ABSTRACT

Apparatus for identifying the position of the movable portion of a fifth wheel which is useful on a multi-axle vehicle relative to the fixed rail portion (24) thereof. The apparatus includes sensing element (34) positioned on the movable fifth wheel portion for recognizing the successive, teeth-like elements (22) of the rail portion, and a signal processor (30) which is responsive to the sensing element (34) for determining the direction of movement of the fifth wheel and for counting the number of teeth (22) recognized by the sensing element (34).

6 Claims, 5 Drawing Figures

APPARATUS FOR DETERMINING THE POSITION OF A FIFTH WHEEL ON A MULTI-AXLE VEHICLE

1. Technical Field

This invention relates generally to the art of fifth wheel apparatus for multiple axle vehicles and more particularly concerns apparatus for determining the position of the movable portion of the fifth wheel relative to the fixed portion thereof.

2. Background Art

Multiple axle vehicles, particularly heavy load vehicles such as a tractor/trailer, typically include what is known as a fifth wheel, which is an apparatus at the rear of the tractor portion of the vehicle to which the trailer portion is rotatably attached. A portion of the fifth wheel apparatus is typically movable longitudinally relative to another portion thereof which is fixed to the tractor, which movement has the effect of changing the distribution of the weight of the loaded vehicle between the front axle, the driver's axle and the trailer axle. Weight distribution in such vehicles is set by state law, and thus, the special relationship of the trailer to the tractor is quite important.

It is also well known that when the fifth wheel is fully extended, i.e. in the position where there is the greatest separation between the tractor and the trailer, a smoother ride results, which is desirable for highway driving. On the other hand, when the fifth wheel is fully closed, i.e. in the position where there is the least separation between tractor and trailer, the vehicle is more maneuverable, which is typically desirable in urban driving situations. The distance through which the fifth wheel may be extended is approximately 3–4 feet, which provides a significant weight redistribution capability, as well as a significant range in maneuverability and ride.

It is also well known that it is quite difficult to adjust the position of the fifth wheel when the trailer is secured to the tractor. The driver must first unlock the fifth wheel, and move the tractor (with the fixed portion of the fifth wheel) either forward or backward the desired amount. The movable portion of the fifth wheel engages the fixed portion thereof at successive longitudinal positions which are relatively close together, and accordingly, it is relatively easy to vershoot or undershoot the desired engaged position of the fifth wheel. The driver of the vehicle is required to leave the cab of the vehicle to inspect the position of the fifth wheel with each adjustment. This procedure usually takes a considerable amount of time, and after several failed attempts, can be quite annoying.

Several patents are known to the applicant which deal with the issue of proper weight distribution for a multi-axle vehicle, including U.S. Pat. No. 4,505,344 to Hobbs. Such devices are complicated, however, and expensive and may be difficult to adapt to existing fifth wheel structures. Applicant's invention, on the other hand, is relatively simple and can be conveniently added to existing fifth wheel apparatus. It does not determine the weight on each axle directly, but instead monitors the position of the fifth wheel, so that the driver may conveniently control the position of the trailer relative to the tractor, so as to vary the weight distribution in a desired manner and/or vary the handling/ride of the vehicle.

DISCLOSURE OF THE INVENTION

Accordingly, the present invention is an apparatus for identifying the position of the movable plate portion of a fifth wheel apparatus, the fifth wheel apparatus being useful on a multiple axle vehicle relative to the fixed rail portion thereof, wherein the movable portion can be locked to the fixed portion in operation of the vehicle. The apparatus includes means for recognizing successive lockable positions of the movable portion relative to the fixed portion, means for counting the successively recognized positions as said movable portion and said fixed portion move relative to each other, and means for setting said counting means to a known value when said movable portion of the fifth wheel apparatus is in a known position relative to said fixed portion, so that the relative position of the movable portion and the fixed portion is known during relative movement of the fixed portion and the movable portion.

BEST MODE FOR CARRYING OUT THE INVENTION

Figure 1:
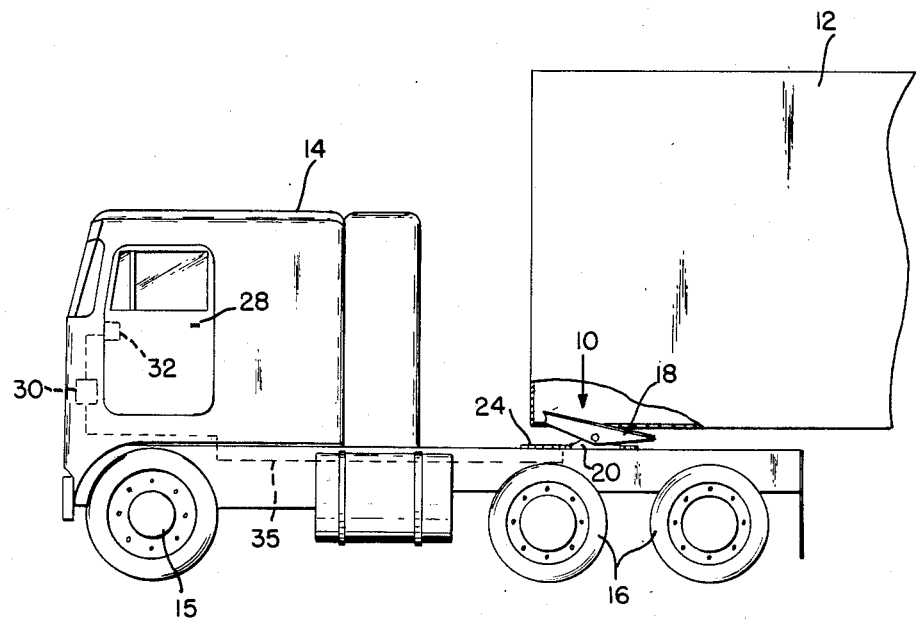
FIG. 1 is a schematic view showing the apparatus of the present invention in place of a fifth wheel of a conventional tractor/trailer vehicle.
Figure 2:
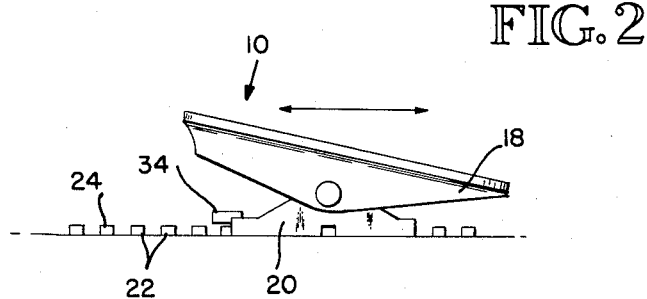
FIG. 2 is an elevation view showing the sensing element portion of the present invention in place relative to a fifth wheel structure.

FIG. 1 shows a fifth wheel structure used on multiple axle vehicles. FIGS. 1 and 2 show the apparatus of the present invention. Operationally, the fifth wheel, shown generally at 10, is an interface between a truck trailer 12 and a truck tractor 14. As an example, the truck/trailer of FIG. 1 includes five separate axles, one axle 15 at the front of the truck, two axles 16 near the rear of tractor 14 and two axles at the rear of trailer 12 (not shown). The fifth wheel 10 is located above the axles 16 on the tractor.

The fifth wheel 10 in the embodiment shown comprises a fifth wheel plate 18 which is generally mounted so as to slope slightly toward the rear of the tractor 14. The fifth wheel plate 18 is mounted on two horizontally opposed slides (20 is shown), which are located at the opposite sides of the fifth wheel plate. The fifth wheel plate is typically pivotally connected to the slides by means of a horizontal pin or the like. The fifth wheel plate and the slide form the movable portion of the fifth wheel. The slides 20 engage fixed position horizontal rails (24 is shown) which each comprise a succession of approximately 20 to 30 upstanding teeth 22 with notch openings therebetween. The rails form the fixed portion of the fifth wheel and are secured to the frame of the tractor.

The teeth of each fixed rail are configured so as to facilitate locking of the sliders to the rails. The rail teeth 22 are slightly wedge-shaped in top view, increasing slightly in width from the outside edge of the rail in the direction of the inner edge thereof. The alternating notches have the opposite configuration but are similar in size. Located in each slide is a wedge (not shown), which moves laterally and is controlled pneumatically by compressed air. In order to lock the slides to the rails, compressed air is used to force the wedge between two adjacent teeth. This results in the fifth wheel plate being fixed in position longitudinally.

In the center of the wheel plate is an opening for receiving a connecting extension (not shown) from the trailer. This extension is secured to the fifth wheel plate but it is rotatable thereabout, so that the tractor and trailer portions of the vehicle can pivot relative to each other. Such an arrangement permits the maneuverability necessary for such extended length multiple axle truck vehicles. The above-described structure is in itself conventional in the art.

When the wedges in the slides are released by the operator, the slides, and hence the entire movable portion of fifth wheel 10, is free to move longitudinally along the fixed rails 24, typically over a distance of 3–4 feet. The location of the fifth wheel, i.e. the relative position of the plate 18 relative to the rails 24, is important, as pointed out above. However, it has not heretofore been possible to accurately know the position of the fifth wheel plate relative to the rails without visual inspection. Because of the nature of the tractor/trailer vehicle, it is difficult to make minor adjustments in the relative position of the fifth wheel, i.e. for just a few notches. However, the ability to make such minor adjustments is important. Attempts to make required minor adjustments, in order to make the weight requirements, frequently lead to frustration and annoyance, because the desired locking point is separated from adjacent locking points by a very small distance.

The present invention identifies positively the position of the fifth wheel, by identifying the position of the movable fifth wheel plate relative to the fixed rails. It does this by monitoring the number of teeth on the rails passed by the fifth wheel plate from a known base position. The amount of movement of the fifth wheel in both directions is continuously determined, so that the location of the fifth wheel relative to the rails is always known.

Referring to FIGS. 1 and 2, the present invention includes a sensing element portion 34 (FIG. 2) which is located on one slide of the fifth wheel, as well as electrically conducting leads 35 which extend from the sensing element along the frame of the truck, through the fire wall of the cab, and into the cab 28. Within cab 28 is located a signal processor 30, which is typically located under the dash, and a display unit 32, which in operation displays the analog number of the rail tooth in which the movable portion of the fifth wheel is presently positioned.

Referring now to FIG. 2, the sensing element portion 34 of the present invention in the embodiment shown is configured as an attachment which can be conveniently added on to an existing or new fifth wheel structure at the front end of either of the slides. The sensing element 34 is secured to the front end of a slide, such as slide 20, in the embodiment shown, by means of clips or the like. It is possible, although usually not desirable, to secure the sensing element 34 to the slide by means of screws or similar means.

In the lower surface 36 (FIG. 3) of sensing element 34 are positioned a pair of sensors 38-38, which sense the proximate presence of metal, i.e. the upstanding rail teeth. The sensors in the embodiment shown are positioned side-by-side longitudinally of the slide, and hence also the rail teeth, with sufficient longitudinal separation relative to the size of the alternating rail teeth and slots that one sensor will be positioned directly over a tooth while the other is positioned about a point which is approximately ⅜ths of the center-to-center distance between the one tooth and the next subsequent tooth.

The sensing element 34 can have various configurations, as long as it can be conveniently secured to the slide 20, and provides proper support for the sensors. In the embodiment shown, the lower surface 36 of the sensing element extends to within approximately ¼ inch of the upper surface of the teeth of the rail. The required proximity will depend upon the particular sensors used.

Electrical leads 40A, 40B extend from the sensors in the sensing element and are routed down to the frame of the truck, through the firewall, and into the cabin 28 of the truck, where the leads are connected to the signal processor 30. The sensing element 34 includes a conventional signal generator 34 which produces an interrogating signal for the sensors 38. The signal from the signal generator is applied to the sensors 38, the structure and operation of which is explained in more detail below. The sensors, by virtue of the electrical signals from the signal generator, will in operation provide an indication of the presence/non-presence of rail teeth. One sensor is used to determine the direction of movement of the movable portion of the fifth wheel relative to the fixed rails. The other sensor is used to count the number of teeth passed by the other sensor as the movable portion of the fifth wheel moves relative to the fixed portion. The electrical condition of the two sensors is continuously monitored by direction-detector logic in the signal processor circuit 30. The count signal from the other sensor is then accumulated and displayed in the cab of the vehicle.

Figure 3:
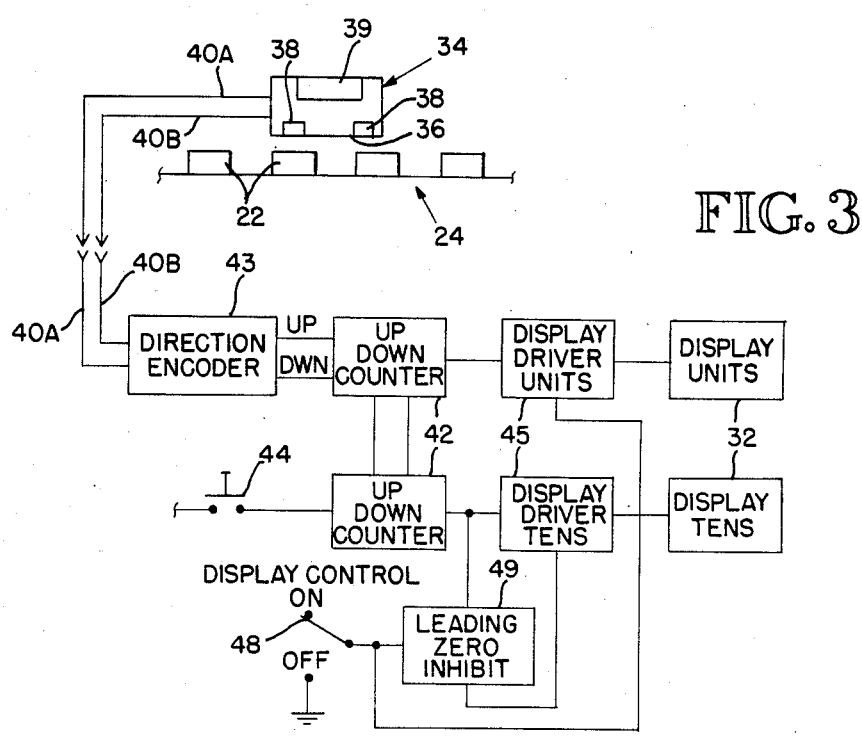
FIG. 3 is a block diagram showing the signal processing circuit of the apparatus of FIG. 1.
Figure 4:
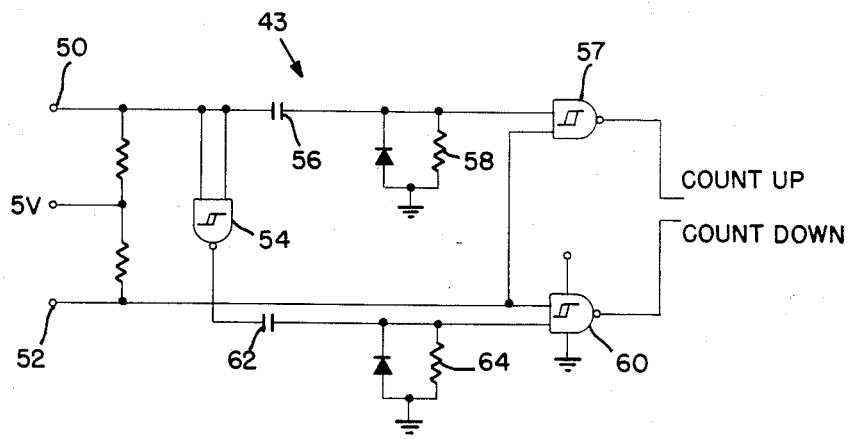
FIG. 4 is a schematic diagram showing a portion of the signal processing circuit of the apparatus of FIG. 1.

FIGS. 3 and 4 show more of the details of the signal processor of the present invention. Initially, the counter circuit 42, which in the embodiment shown are two cascaded 10 unit up/down BCD counters, implemented in CMOS, providing a count capability of 99, is set to zero by operation of reset switch 44, when the movable portion of the fifth wheel, i.e. the fifth wheel plate 18 and the slides 20, is in its most forward position. The display 32, which in the embodiment shown are two 0-9 LED display units, are driven by two conventional 7 segment decoder/driver circuits 45, also implemented in CMOS. The LED readout is analog, 0–99, and is seen through a window of the display 32. Since the counters, decoder/drivers and the LED display are well-known, no detailed explanation of their structure is provided.

The display 32 is controlled by on-off switch 48. When the switch is on, an analog number in the display is lit, and when the switch is off, the display is dark. A zero-inhibit circuit 49 which detects the presence of a zero on the output of the tens counter and then inhibits the BCD output of the counter to the decoder (drive circuit) is operative for the ten's place on the display when that place is not in use. The on-off switch 48 controls only the display 32. The CMOS implemented counter circuit 42 draws virtually no power so it is maintained in an active state as long as the vehicle battery is operative and connected to the unit. This provides the unit with a memory capability; i.e. the count remains in the counter when the display is turned off, so that when the display is turned on again, the count is again displayed. The entire unit in operation is powered by the on-board truck battery and does not require a separate power source.

In one embodiment of sensing element 34, the output of a 10 KHz oscillator (the signal generator) is capacitively coupled to two induction coils. Associated with each coil is a capacitor, resulting in two resonant circuits, which form the two sensors 38-38, with the capacitor/coil unit resonating at the oscillator frequency in the absence of metal in the proximity of the unit. The voltage across each of the resonant circuits is detected and filtered and compared to a preset threshold voltage. If there is no metal in close proximity ot the resonant circuit, the voltage on the output of the comparator is low, i.e. near ground.

When either of the resonant circuits is in the proximity of metal, such as the teeth on the rail 24, the resonant frequency of the circuit changes and a current loss occurs due to the lowering of the Q of the resonant circuit. In this condition, the amplitude of the AC voltage across the resonant circuit will decrease and when that amplitude is less than the threshold voltage at the comparator, the comparator output will go high. This high signal is the circuit indication of the close proximity of a metal tooth on the rail. The outputs from the comparator are shown as 40A and 40B and will vary between a low and a high value, depending upon the proximity of the metal teeth of the rail to the sensors.

Another embodiment of sensing element 34 also uses two resonant circuits as sensors 38, but with an operating frequency of 12 mHz. When a metal element is in close proximity to the sensor, the resonant frequency of each circuit is decreased, thereby detuning the resonant circuit and reducing the voltage detected across the resonant circuit. When the detected voltage is lower than the voltage supplied by a fixed power supply, the output of the comparator will go high.

Figure 5:
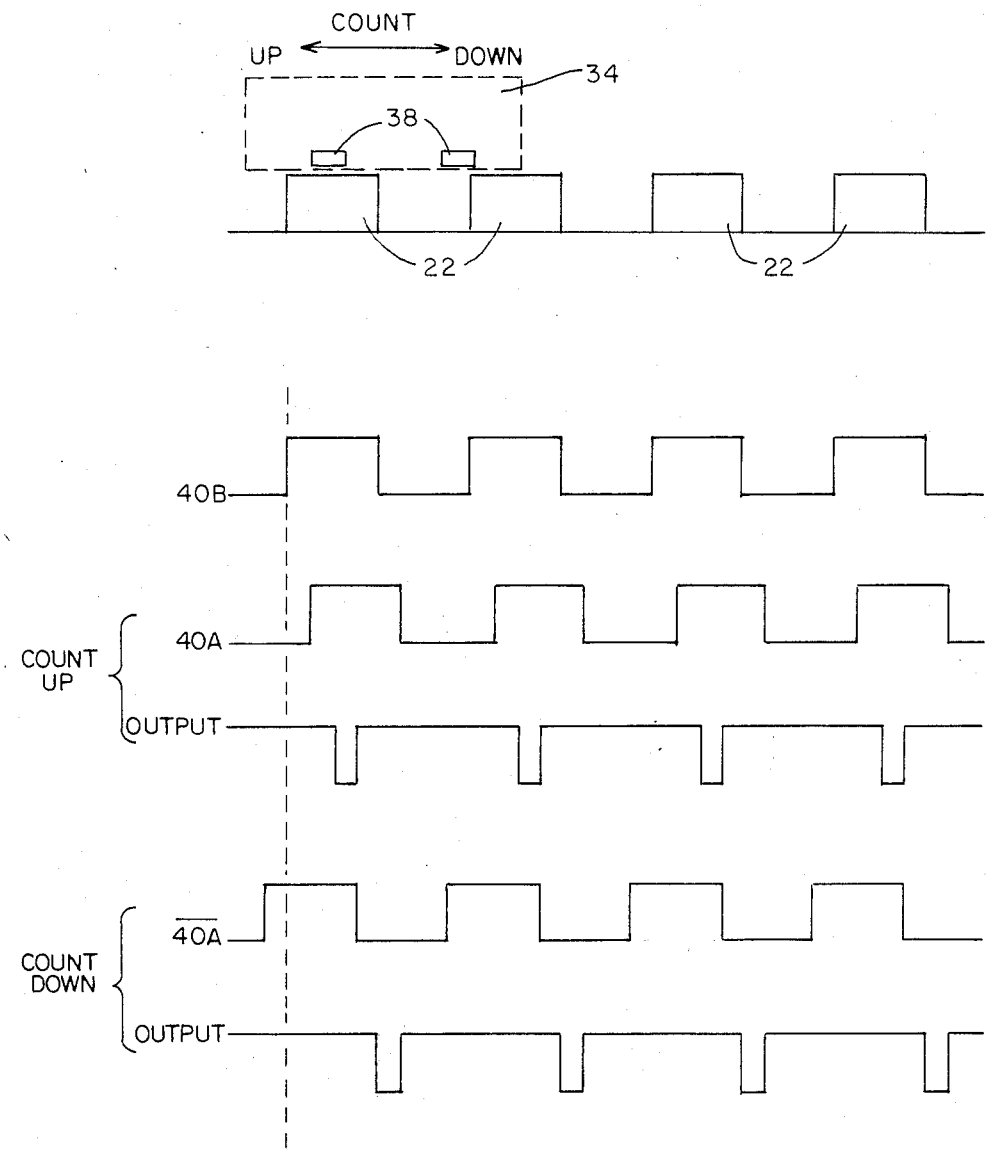
FIG. 5 is a signal diagram from the sensing element portion of the apparatus of FIG. 1.

The outputs from sensing element 34 on lines 40A and 40B are supplied to a direction encoder 43 which is shown in block form in FIG. 3 and in more detail in FIG. 4. The waveform diagram is shown in FIG. 5. The direction encoder 43 receives the information from the sensing element 34. The two sensors are arranged on the lower surface of sensing element 34 such that the transition of the signal on line 40A when the signal on line 40B is high determines the direction of the count. When line 40B is high and line 40A transitions from low to high, the trailer is moving away from the tractor and the count direction is up. The count up pulses are initiated by each successive transition from low to high on line 40A. When the trailer moves in the opposite direction relative to the tractor, the signal on line 40A will transition from high to low when line 40B is high. The count down pulses are initiated by the successive transitions of the signal on line 40A from high to low.

The circuit is shown in more detail in FIG. 4. The signal on line 40A is applied to input line 50, while the signal on line 40B is applied to input line 52. When 40B is high and 40A transitions to high, i.e. a count up mode, the high on 40A is integrated through capacitor 56, resulting in a pulse on one input of Schmidt NANDgate 57. Since the other input to NANDgate 57 is high, the output of the NANDgate goes low. When the capacitor 56 becomes charged through resistor 58, the one input of NANDgate57 returns to ground and its output pulse is high, which results in a one count up for the counter. Each successive transition from low to high of line 40A will result in one additional count up.

When the the signal on line 40B is high and the signal on line 40A transitions to low, the output of NANDgate 54 goes high, providing a pulse to the input of Schmidt NANDgate 60 during the charge cycle of capacitor 62 causing the output of NANDgate 60 to go low during the charging of capacitor 62. When capacitor 62 becomes charged through resistor 64, the output of NANDgate 60 goes high, providing a pulse to count down the counter one count. Each additional transition of line 40A to low will result in an additional count down.

In operation of the apparatus, the driver of the vehicle will first select the desired slot in which the fifth wheel is to be locked. The basis for the selection might include redistribution of weight between the various axles of the vehicle, lengthening the distance between the trailer and the tractor in order to improve the ride of the vehicle, or shortening the distance between the trailer and the tractor in order to improve the maneuverability of the vehicle. There may be other reasons as well which would impact the selection of fifth wheel position. The display 32, when activated, will show which notch the fifth wheel is actually in. Alternatively, the trailer could be positioned in its most forward location, at which point the display can be reset to zero.

If the fifth wheel has not already been released to permit movement of the trailer to its forward position, the driver will now operate the airlocks to release the fifth wheel slides from the rails 24 and will then maneuver the tractor relative to the trailer, which remains stationary. As the tractor is moved, the teeth on the rails move relative to the slides and hence the fifth wheel plate, and the display will indicate the successive positions of the fifth wheel. Upon maneuvering the tractor so that the number of the desired notch is displayed, the driver stops the tractor, and locks the fifth wheel in place. In the process, should the tractor/trailer have moved so that the fifth wheel is about to be locked in a different notch than the one desired, the display would not the change in relationship, permitting the driver to take corrective action before locking occurs and without getting out of the cab of the vehicle.

Thus, a fifth wheel counter is provided which includes an in-cab display indicating which notch the fifth wheel is positioned in. The driver of a multiaxle vehicle using the present invention can conveniently change the length of the vehicle, locking the fifth wheel in any desired position, without the frustration of having to make repeated out of cab inspections.

Although a preferred embodiment of the invention has been disclosed herein for purposes of illustration, it should be understood that various changes, modifications and substitutions may be incorporated in such embodiment without departing from the spirit of the invention, as defined by the claims which follow.

We claim:

1. An apparatus for identifying the position of the movable plate portion of a fifth wheel apparatus useful on a multiple axle vehicle relative to the fixed rail portion thereof to which the movable portion can be locked, the apparatus comprising:

means for recognizing successive lockable positions of said movable portion relative to said fixed portion;

means for counting the successively recognized positions as said movable portion and said fixed portion move relative to each other; and means for setting said counting means to a known base value when said movable portion of the fifth wheel apparatus is in a known position relative to said fixed portion, so that the relative position of the movable portion and the fixed portion is known during relative movement of the fixed portion and the movable portion.

2. An apparatus of claim 1, including means for displaying the position of the movable portion as an analog number.

3. An apparatus of claim 2, wherein said recognizing means is located on the movable portion.

4. An apparatus of claim 2, wherein said counting means includes means for increasing the count as the movable portion changes position in one direction relative to the fixed portion and for decreasing the count as the movable portion changes position in the other direction relative to the fixed portion.

5. An apparatus of claim 4, wherein said recognizing means including means for detecting successive raised elements on said fixed rail portion.

6. An apparatus of claim 5, including two sensing means positioned on said movable portion for recognizing the proximity of a raised element on the rail portion, said sensing means being spaced so that only one sensing means is positioned over a given raised element at any one time.

* * * * *